W. W. JACKSON.
LAVATORY FITTING.
APPLICATION FILED JUNE 26, 1914.

1,134,743.

Patented Apr. 6, 1915.

WITNESSES
Paul M. Critchlow
Francis J. Tomason

INVENTOR
William W. Jackson
by Christy and Christy
his attorneys.

UNITED STATES PATENT OFFICE.

WILLIAM W. JACKSON, OF TORONTO, ONTARIO, CANADA, ASSIGNOR TO STANDARD SANITARY MANUFACTURING COMPANY, OF PITTSBURGH, PENNSYLVANIA, A CORPORATION OF NEW JERSEY.

LAVATORY-FITTING.

1,134,743.     Specification of Letters Patent.     Patented Apr. 6, 1915.

Application filed June 26, 1914. Serial No. 847,461.

*To all whom it may concern:*

Be it known that I, WILLIAM W. JACKSON, residing at Toronto, in the Province of Ontario, Canada, a subject of the King of Great Britain, have invented or discovered certain new and useful Improvements in Lavatory-Fittings, of which improvements the following is a specification.

My invention relates to that class of lavatory fittings wherein there is a single discharge spout for hot and cold water, and wherein the connections of the spout to the sources of supply, as well as the means of controlling the basin waste outlet, extend through a single opening in the flange of the basin with which such fitting is intended to be used.

It is the object of my invention to simplify the construction and installation of fittings of this particular type, to increase their efficiency of operation and to reduce their manufacturing cost.

In the accompanying sheet of drawings, forming part of my specification, I have illustrated the preferred embodiment of my invention.

Figure 1:
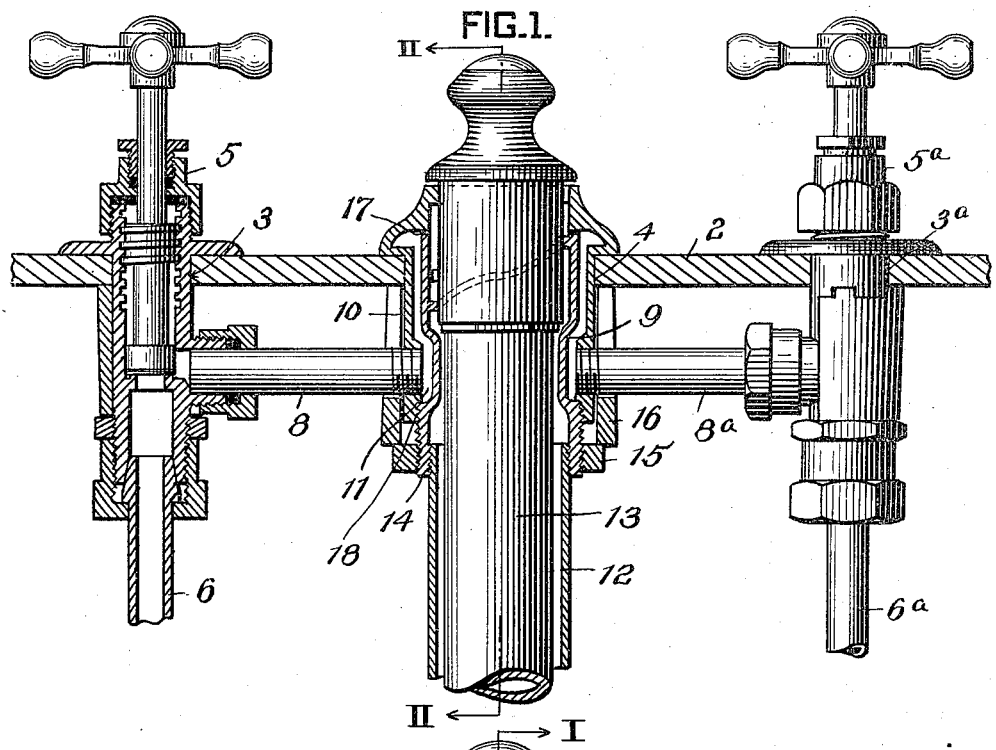
Figure 2:
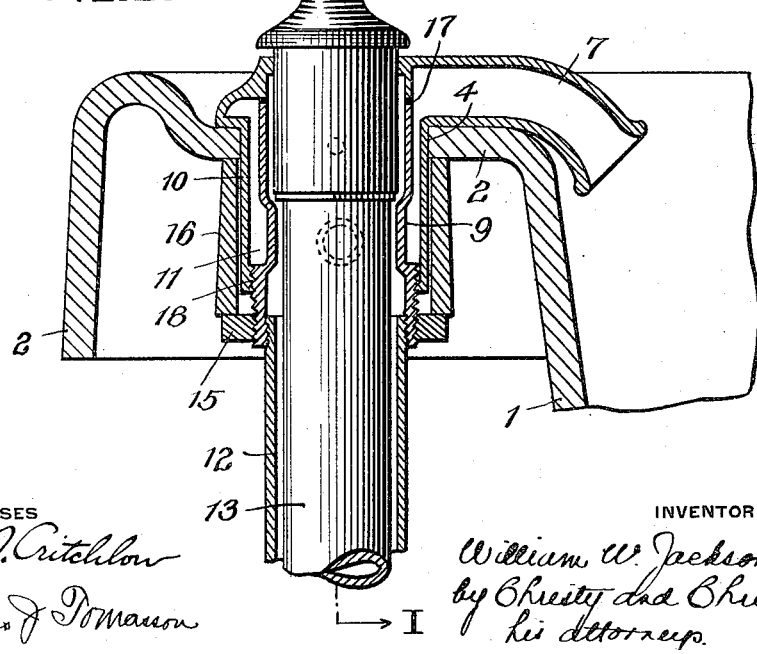

Figure 1 is a sectional elevation taken on the line I—I, Fig. 2; and Fig. 2 is a similar view taken on the line II—II, Fig. 1.

In the general installation to which my improved fitting is particularly applicable, the basin comprises a body portion 1 and a horizontally disposed flange 2 provided with three openings 3, 3ª, and 4. The basin may be made of any desired material, such as enameled cast iron, or pottery. In the openings 3 and 3ª there are placed hot and cold water spigots 5 and 5ª of any preferred construction, such spigots being connected to suitable sources of supply by means of pipes 6 and 6ª, and controlling the flow of water through pipes 8 and 8ª to a single outlet nozzle 7.

The outlet fitting, forming the subject-matter of my invention, consists of a cylindrical member having an inner wall 9 and an outer wall 10 forming between them an annular chamber 11, which extends below and through the basin flange opening 4. The pipes 8 and 8ª are secured to opposite sides of the wall 10, and open into the chamber 11, which, as shown in Fig. 2, communicates with the nozzle 7 having its outlet orifice extending into the body portion 1 of the basin.

To facilitate the manufacturing of the fitting the inner and outer walls are formed of separate pieces connected at their upper ends by a fiber joint 17, and by a screw-thread and soldered joint 18 at their lower end. The wall 9, together with a pipe 12, forms a casing for the waste valve stem 13, which stem is movable through such casing to control the waste outlet of the basin. The construction of the waste valve and outlet is well known and not illustrated herein. The member 9 is provided at its lower end with a lip 14, screw threaded interiorly to receive the casing 12, and exteriorly to receive a nut 15 which bears upon a spacing sleeve 16 between such nut and the basin flange 2.

It will be observed of my invention that the chamber 11 is large as compared with the size of the pipes 8 and 8ª, and that such pipes, rather than discharging water against the open ends of each other, discharge against the inner wall 9. By such a construction the hot and cold water will mingle freely, and the flow of the weaker stream will not be retarded by that of the stronger.

I claim as my invention:

1. The combination of a basin with a horizontal flange having an opening therethrough, a valve stem casing extending vertically through said opening, an annular chamber surrounding said casing and extending through and below said basin flange opening, supply connections opening to said chamber beneath said flange, and a discharge spout leading from said chamber above the opening and into the basin.

2. The combination of a basin with a horizontal flange having an opening therethrough, a valve stem casing extending vertically through said opening, an annular chamber surrounding said casing and extending through and below said basin flange opening, supply connections opening to and at opposite sides of said chamber beneath said flange, and a discharge spout leading from said chamber above the opening and into the basin.

3. The combination of a basin with a horizontal flange having an opening therethrough, an annular fitting member extending vertically through said opening and comprising inner and outer cylindrical walls made of separate pieces and forming an annular chamber, said chamber extending through and below the basin flange-opening and communicating above said opening with a single discharge spout leading into the basin, supply connections opening into oppositely disposed sides of said chamber and adapted to discharge their contents against the inner wall thereof, a ring depending from said member and screw-threaded interiorly and exteriorly, a pipe attached to the interior threads of said ring and forming with the inner wall of said fitting member a valve stem casing, a locking nut engaging the outer threads of said ring, and a spacing sleeve between said nut and the lower surface of said flange.

4. The combination of a basin with a horizontal flange having an opening therethrough, an annular fitting member extending through said opening and comprising inner and outer walls made of separate pieces and forming an annular chamber, said chamber extending through and below the basin flange-opening and communicating above the opening with a discharge spout leading into the basin, supply connections opening into said annular chamber below the basin flange, and a valve stem extending through said opening and within the inner wall of said annular chamber.

In testimony whereof I have hereunto set my hand.

WILLIAM W. JACKSON.

Witnesses:
D. S. TOVELL,
H. M. CHRISTMAN.

Copies of this patent may be obtained for five cents each, by addressing the "Commissioner of Patents, Washington, D. C."